(12) United States Patent
Guerrero

(10) Patent No.: US 7,308,928 B2
(45) Date of Patent: Dec. 18, 2007

(54) METHOD OF MAKING A MULTI-ELEMENT MOLD ASSEMBLY FOR, E.G., FOOTWEAR COMPONENTS

(75) Inventor: Joe Guerrero, Gaston, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 11/326,573

(22) Filed: Jan. 6, 2006

(65) Prior Publication Data

US 2006/0175036 A1    Aug. 10, 2006

Related U.S. Application Data

(60) Provisional application No. 60/644,521, filed on Jan. 19, 2005.

(51) Int. Cl.
  *B22C 9/06* (2006.01)
  *B22C 9/22* (2006.01)
  *B22D 33/04* (2006.01)
(52) U.S. Cl. .................. 164/6; 164/137; 164/342
(58) Field of Classification Search ............ 164/6, 164/312, 34, 35, 137, 339, 342
See application file for complete search history.

(56) References Cited

U.S. PATENT DOCUMENTS 2,182,775 A * 12/1939 Abouchar .............. 249/135
4,302,169 A   11/1981 Deoliveria et al.
5,368,086 A   11/1994 Kloskowski
5,435,959 A    7/1995 Williamson et al.
6,510,887 B1 *  1/2003 Ishihara et al. ............ 164/6
2004/0080077 A1  4/2004 Gumringer

FOREIGN PATENT DOCUMENTS

WO    0176843 A   10/2001

OTHER PUBLICATIONS

Partial Search Report for PCT/US2006/001606 dated Jul. 13, 2006.
International Search Report and Written Opinion of PCT/US2006/001606 dated Sep. 12, 2006.
Statement Regarding Pre-Filing Activites.

* cited by examiner

*Primary Examiner*—Kevin P. Kerns
(74) *Attorney, Agent, or Firm*—Banner & Witcoff, Ltd.

(57) ABSTRACT

A mold assembly for footwear components is cast as a collection of mold elements having integral attachment members. Attachment members of separate mold elements may then be joined by, e.g., welding. Handles may also be formed into one or more mold elements as part of the casting process. Outsole negatives are juxtaposed with templates for attachment tabs and/or handles and used to form ceramic casting molds. The ceramic casting molds can then be used to cast individual mold elements.

6 Claims, 17 Drawing Sheets

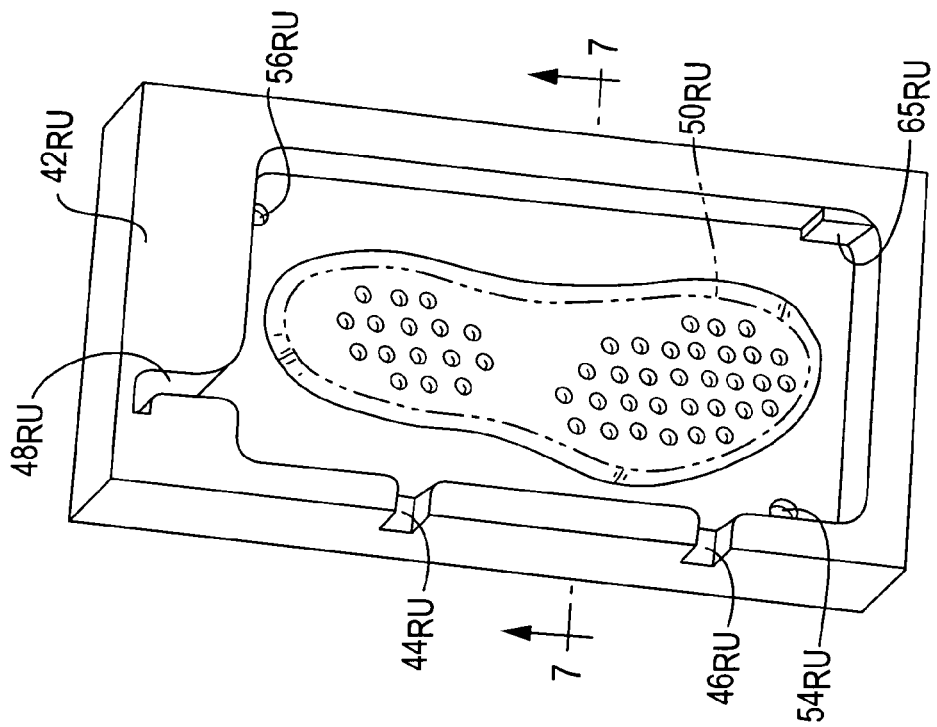
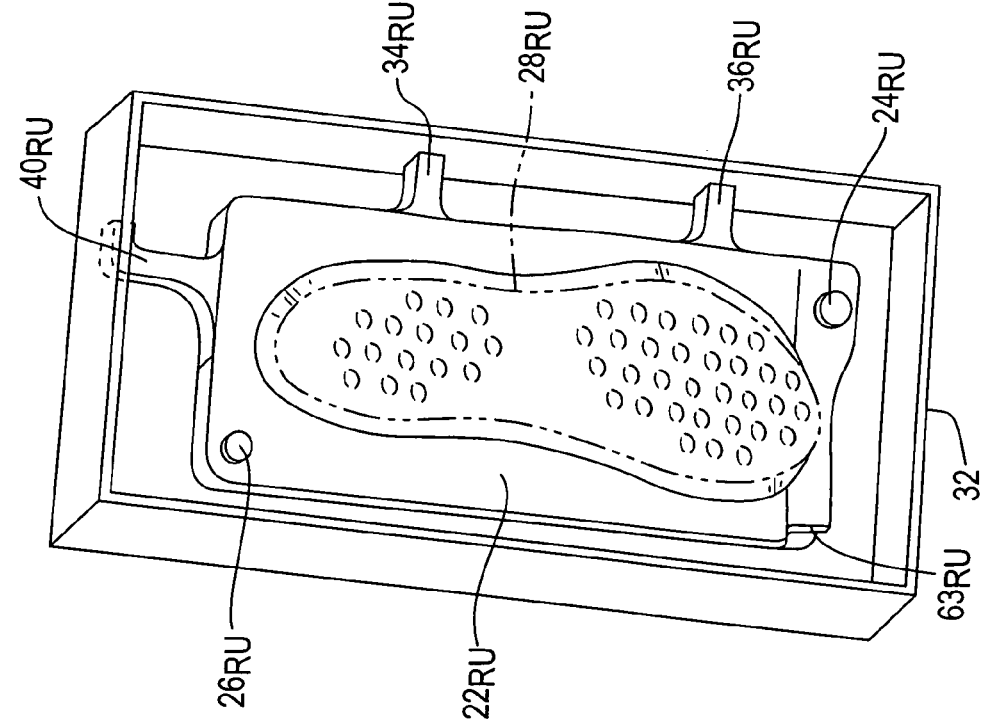

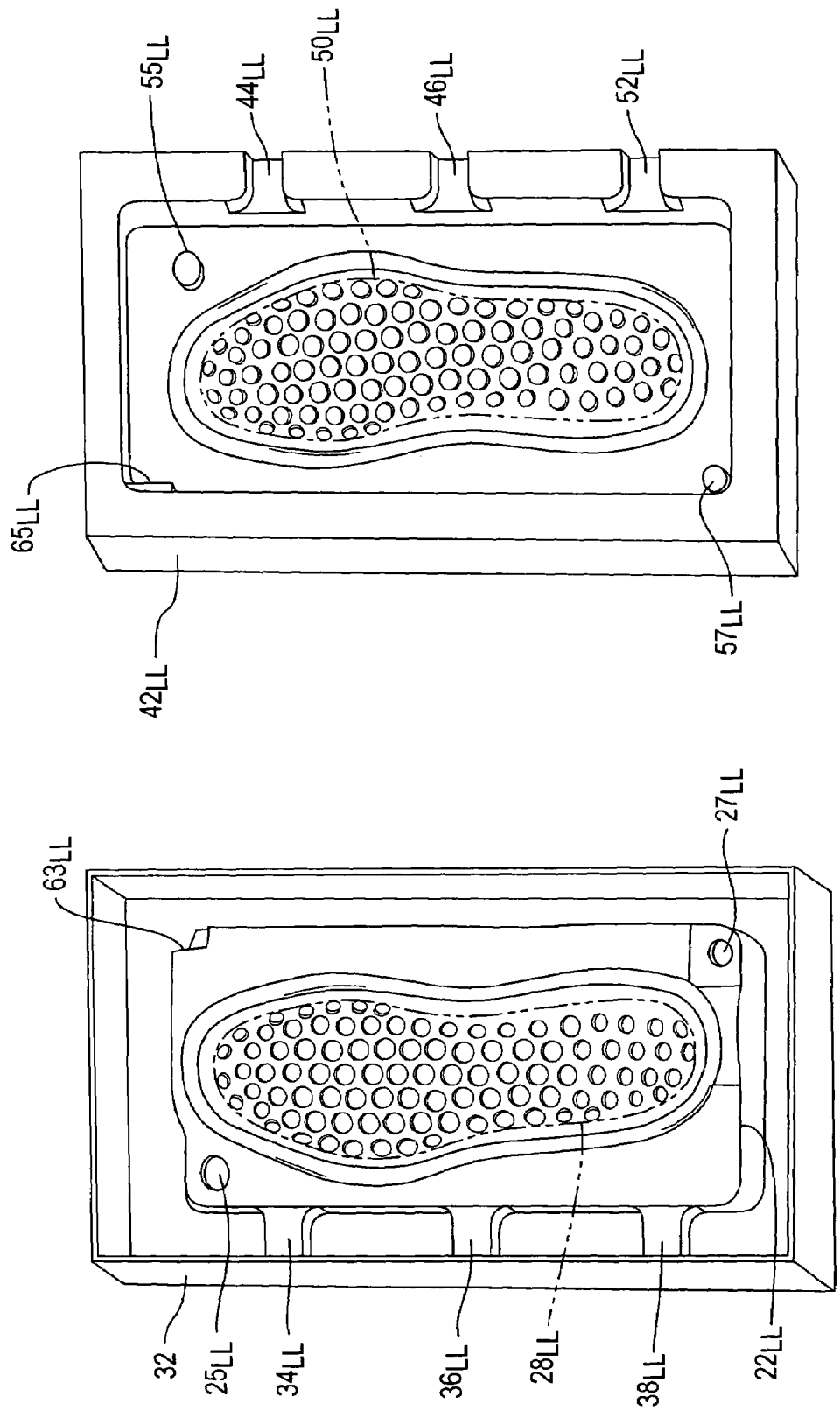

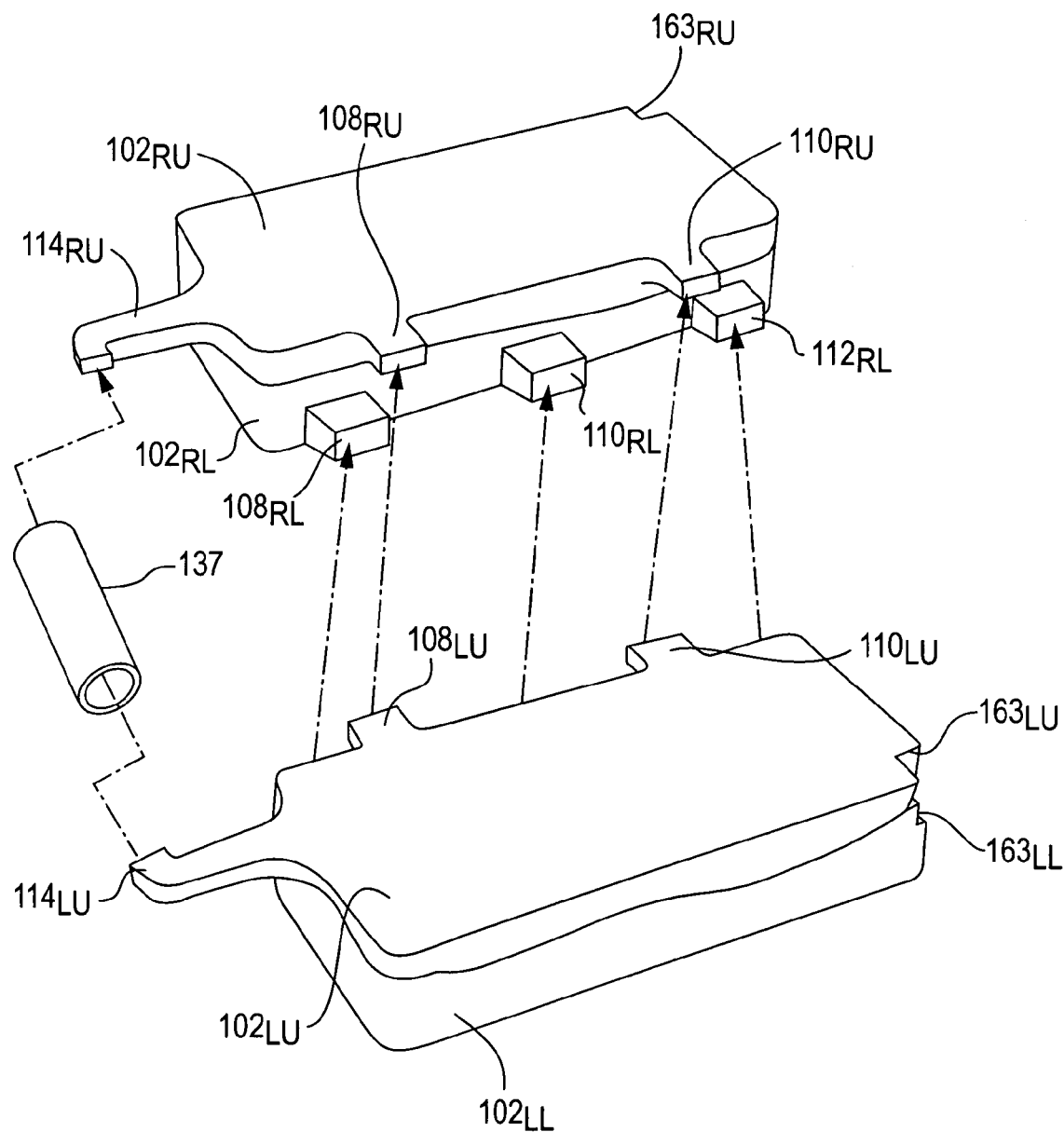

METHOD OF MAKING A MULTI-ELEMENT MOLD ASSEMBLY FOR, E.G., FOOTWEAR COMPONENTS

CROSS-REFERENCE TO RELATED APPLICATIONS

This application claims the benefit of U.S. Provisional Application Ser. No. 60/644,521, filed Jan. 19, 2005 and titled "Method of Making a Multi-element Mold Assembly for, e.g., Footwear Components," which application is incorporated by reference herein.

FIELD OF THE INVENTION

This invention relates to methods for creating multi-element mold assemblies that are used to manufacture, e.g., components for shoes.

BACKGROUND OF THE INVENTION

Molding is a common method used to manufacture a large variety of items. In many cases, a mold includes several pieces which must fit together in order to define the mold volume (i.e., the space to be filled with plastic or other material being molded into a manufactured part). In some cases, a single mold may actually include elements used to mold several parts. One example is a mold used to form outsoles for a pair of shoes. Such a mold is used to simultaneously mold the upper and lower surfaces of two outsoles—a right shoe outsole and a left shoe outsole. Conventional outsole molds can include two mold halves. The first mold half is used to mold the upper surfaces of a pair of outsoles. The second mold half mates with the first half, and is used to mold the lower surfaces of the outsole pair. Each mold half has traditionally been cast as a single piece of steel or other metal, and can be quite heavy.

The location of the parting line can be important when molding shoe outsoles. As is known in the art, the parting line is where portions of a mold meet and seal. Because the seal is often not perfect, a small amount of molded material will often seep through the parting line and leave "flash" on the molded part. Removing flash from a molded part requires extra labor and increases manufacturing cost. Even in the absence of flash, however, a molded part often has a noticeable ridge that corresponds to the parting line. For these reasons, it is advantageous to construct the mold so that the parting line is in a less noticeable location. For outsoles, this often means locating the parting line along an upper edge of the outsole. This upper edge sometimes follows a complex curve.

Beyond being heavy and cumbersome, conventional outsole molds can be expensive and time-consuming to fabricate. In particular, achieving a desired parting line often requires significant hand finishing work after the mold halves are cast. Because of the large amounts of metal used to cast conventional outsole molds, forming the parting line as part of the casting process is difficult. In particular, the large metal volume of a cast mold half holds substantial heat, and significant warpage can occur as the cast mold cools. In order to reduce this warpage, the size of the mold could be reduced by, e.g., separating the upper and lower halves into smaller separate left and right elements. However, this presents additional challenges. For example, joining multiple smaller elements together can introduce additional manufacturing steps into the mold making process.

SUMMARY OF THE INVENTION

According to some embodiments of the invention, a mold assembly for footwear components is cast as a collection of mold elements having a parting line formed during of the casting process. In still other embodiments, mold elements for one or more footwear components are cast so as to have integral attachment members. Attachment members of separate mold elements may then be joined by, e.g., welding. A handle (or a portion of a handle) may also be formed into one or more mold elements as part of the casting process. In some embodiments, outsole negatives are juxtaposed with templates for attachment tabs and/or handle portions. Ceramic casting molds are then created based on these juxtaposed pieces. The ceramic casting molds can then be used to cast individual mold elements.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 5A-5H show creation of ceramic casting molds according to at least some embodiments of the invention.

FIGS. 6A-6E show assembly of mold elements according to at least some embodiments of the invention.

DETAILED DESCRIPTION OF THE PREFERRED EMBODIMENTS

A method for creating a shoe outsole mold assembly is described herein as an example of certain embodiments of the invention. The invention is not limited to the embodiments described herein. The invention also includes methods for creation of molds to form other shoe components. Indeed, embodiments of the invention may also be used to create molds used to manufacture parts unrelated to shoes.

Figure 8:
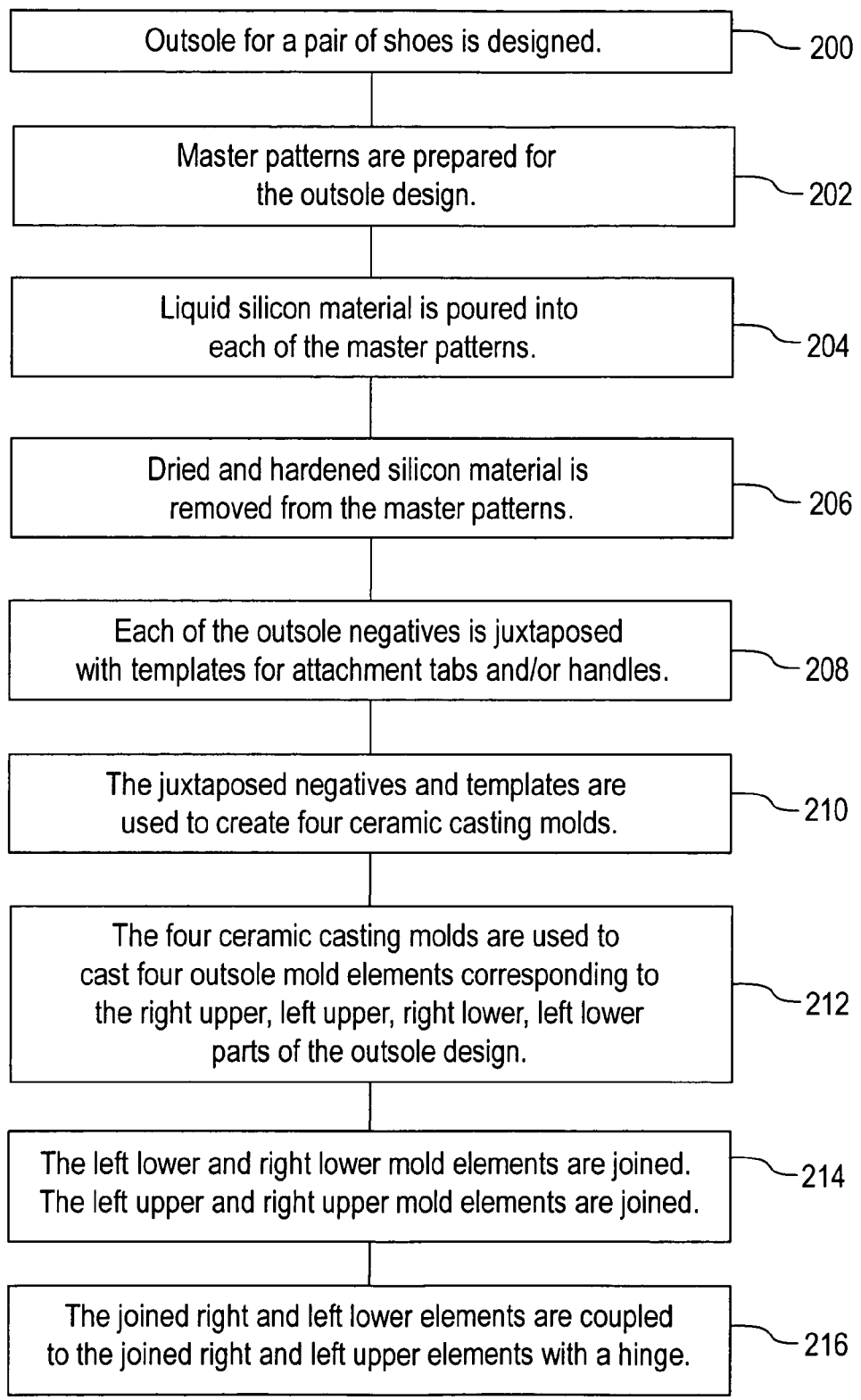
FIG. 8 is a flow chart showing steps for making an outsole mold assembly according to at least some embodiments of the invention.

So as to provide an overview of at least some embodiments of a method for making an outsole mold assembly, FIG. 8 is a flow chart outlining steps of that method. Beginning at step 200, an outsole for a pair of shoes is designed. This typically involves designing a tread configuration for the lower surface of the outsole, and may involve designing a special configuration for the upper surface of the outsole. Generally, outsoles for left and right foot versions of the shoe are designed (i.e., the left foot version is a mirror image of the right foot version). At step 202, master patterns are prepared for the outsole design. The master patterns include three-dimensional models of the outsole; a separate master pattern is created for the upper and lower surfaces of each of the left and right foot designs (four master patterns in all). In step 204, liquid silicon material is poured into each of the master patterns. In step 206, dried and hardened silicon material is removed from the master patterns, yielding four outsole negatives. In step 208, each of the outsole negatives is juxtaposed with templates for attachment tabs (and in some cases, templates for handles). In step 210, the juxtaposed negatives and templates are used to create four ceramic casting molds. In step 212, the four ceramic casting molds are used to cast four outsole mold elements corresponding to the right upper, left upper, right lower and left lower parts of the outsole design. In step 214, the left lower and right lower mold elements are joined. The left upper and right upper mold elements are also joined. In step 216, the joined right and left lower elements are coupled to the joined right and left upper elements with a hinge, resulting in a mold assembly. The mold assembly may then be used to mold right and left shoe outsoles.

Figure 1A:
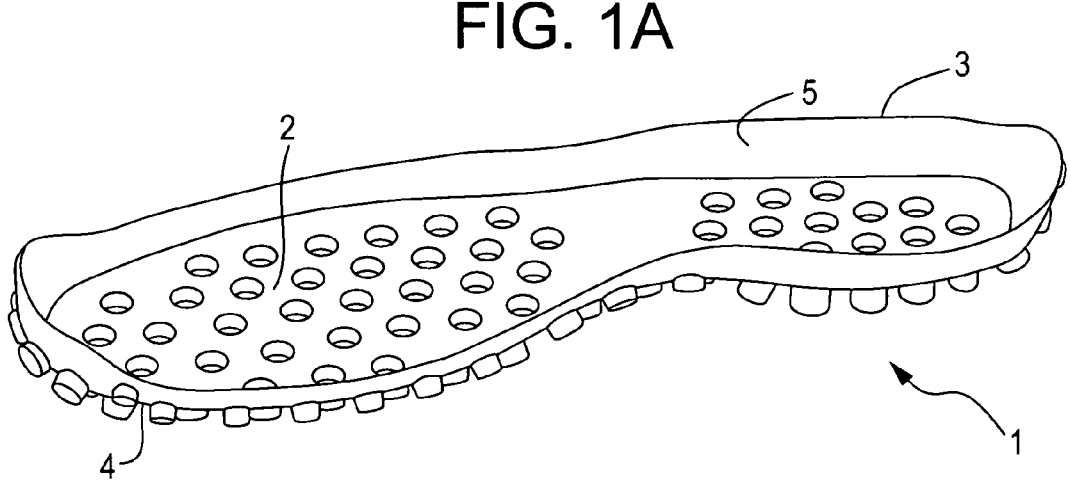
FIGS. 1A and 1B show a shoe outsole used for explaining various aspects of the invention.
Figure 1B:
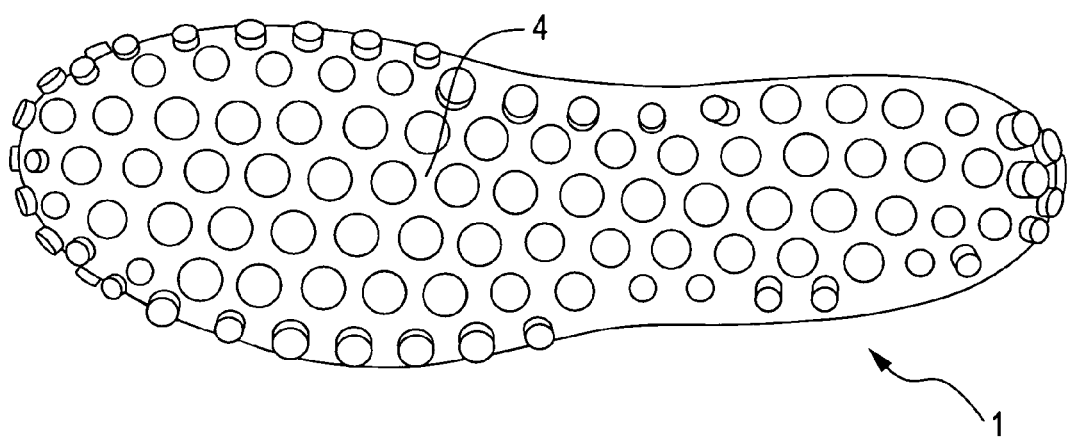
Figure 1C:
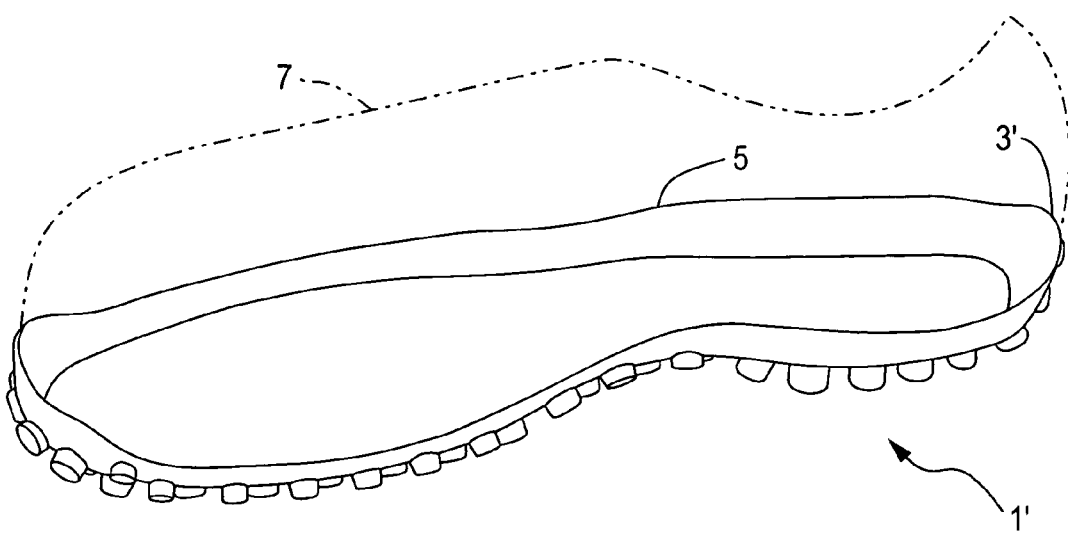
FIG. 1C shows use of the outsole of FIGS. 1A and 1B in a common shoe construction.

Shown in FIGS. 1A and 1B is a shoe outsole 1 formable by molding. Outsole 1 can be made from any of various materials (e.g., synthetic rubber). FIG. 1A shows the upper surface 2 of outsole 1, as well as a small portion of its lower surface 4. Outsole 1 has a raised rim 5 terminating at an upper edge 3. Upper edge 3 follows a three dimensional curve (i.e., the edge curves in two or more non-coincident planes). Raised rim 5 tapers to a minimal thickness at edge 3, and thus provides a good location for a parting line when molding outsole 1. FIG. 1B shows the lower surface 4 in more detail. Lower surface 4 is the ground contacting surface of outsole 1; upper surface 2 (FIG. 1A) faces toward a wearer's foot. Lower surface 4 includes a number of ground-contacting lugs 6. Outsole 1 is configured for use as a removable shoe component, as is described in commonly-owned U.S. patent application Ser. No. 10/787,888. In many cases, however, an outsole is permanently adhered to other shoe elements (e.g., a midsole, an upper) in order to form a complete shoe. FIG. 1C shows an example of how outsole 1 could be incorporated into such a shoe construction. In particular, outsole 1 is adhered to a shoe upper 7 (shown in phantom), with the inside of rim 5 glued to the sides of upper 7. In such a construction, the terminal edge 3 of rim 5 is a good candidate for parting line placement. An outsole for a right shoe is shown in FIGS. 1A-1C. The invention is not limited by the configuration or shape of outsole 1. The details of outsole 1 are provided herein for purposes of reference to the below-described mold elements used to create outsole 1.

Figure 6A:
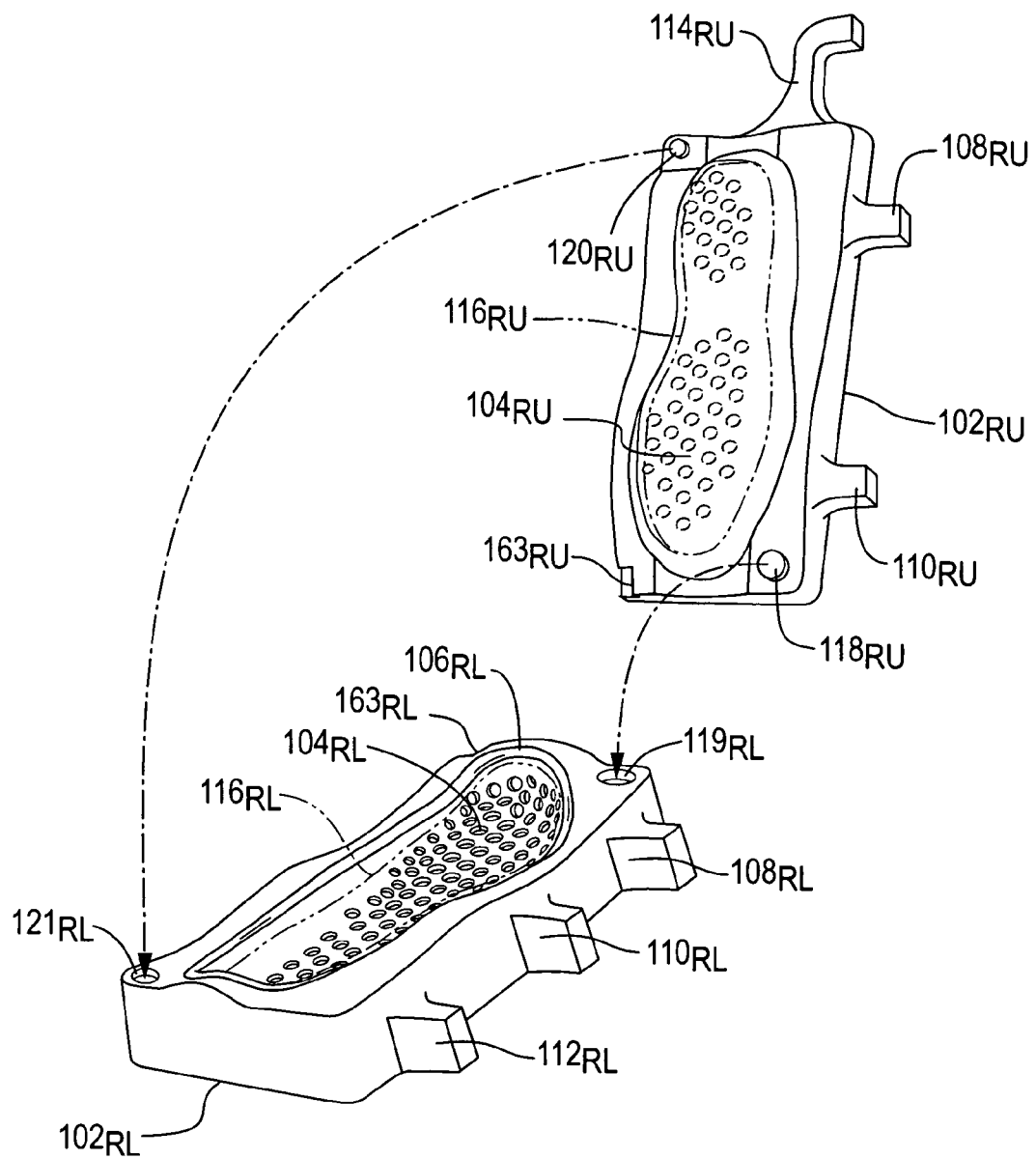
Figure 6B:
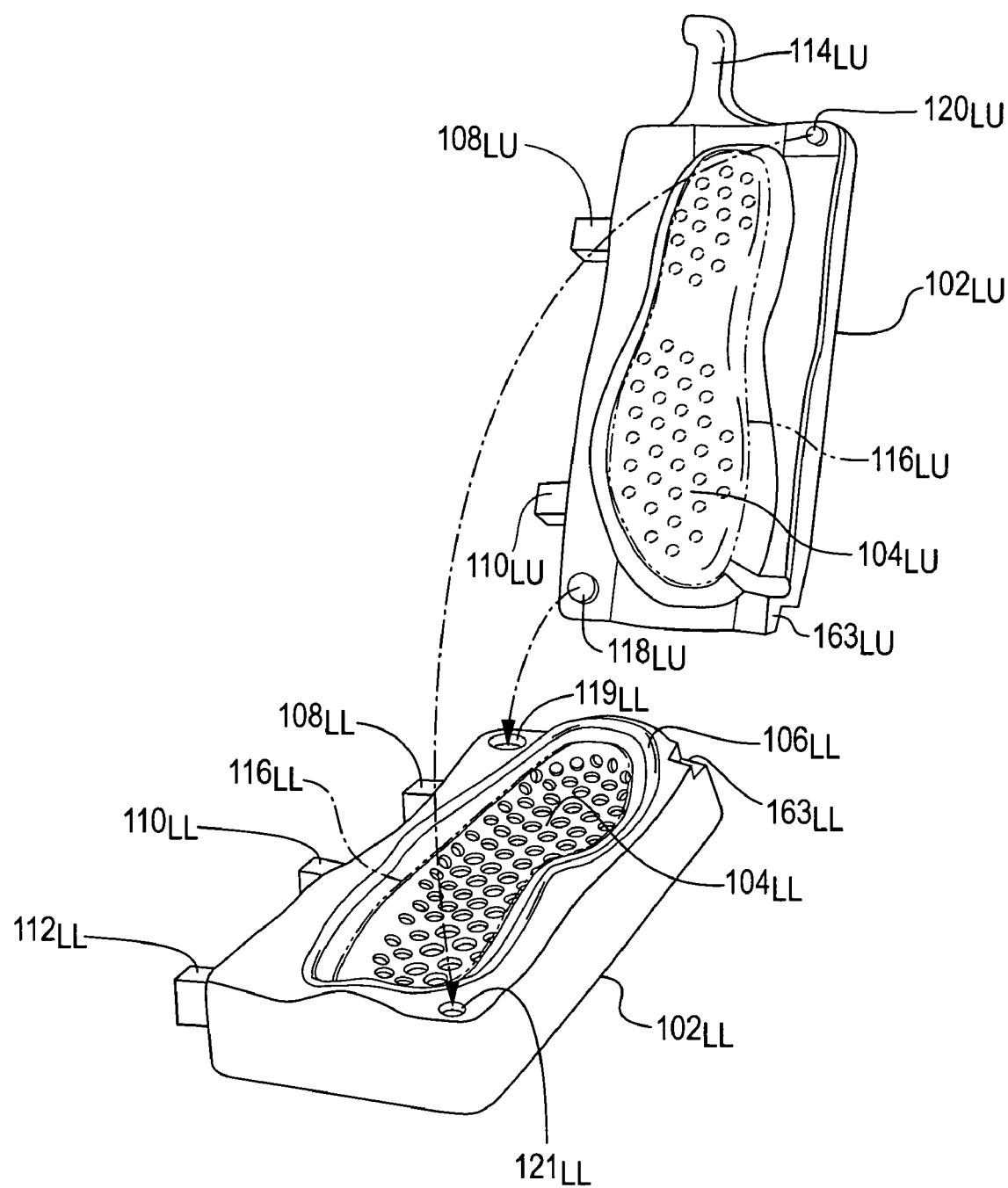

In at least some embodiments, a mold assembly for outsole 1 and for its left shoe counterpart includes four elements. As shown in FIG. 6E, mold assembly 100 includes a right upper element 102$_{RU}$ and a right lower element 102$_{RL}$. Although elements 102$_{RU}$ and 102$_{RL}$ are on the left side of mold assembly 100 in FIG. 6E, they are called right side elements because they are used to mold a right shoe outsole. Mold assembly 100 further includes left upper element 102$_{LU}$ and left lower mold element 102$_{LL}$. Throughout this description, similar features of mold assembly 100 (as well as similar features of components used to create mold assembly 100) will have reference numbers differentiated by the subscripts RU (right upper), RL (right lower), LU (left upper) and/or LL (left lower). As can be seen by comparing FIGS. 1A and 6E, the mold region 104$_{RU}$ of right upper element 102$_{RU}$ corresponds to upper surface 2 of outsole 1. A similar comparison between FIGS. 6E and 1B shows that mold region 104$_{RL}$ of right lower element 102$_{RL}$ corresponds to lower surface 4 of outsole 1. Mold regions 104$_{LU}$ and 104$_{LL}$ of mold elements 102$_{LU}$ and 102$_{LL}$, respectively, correspond to upper and lower surfaces a left shoe outsole (not shown).

Figure 2A:
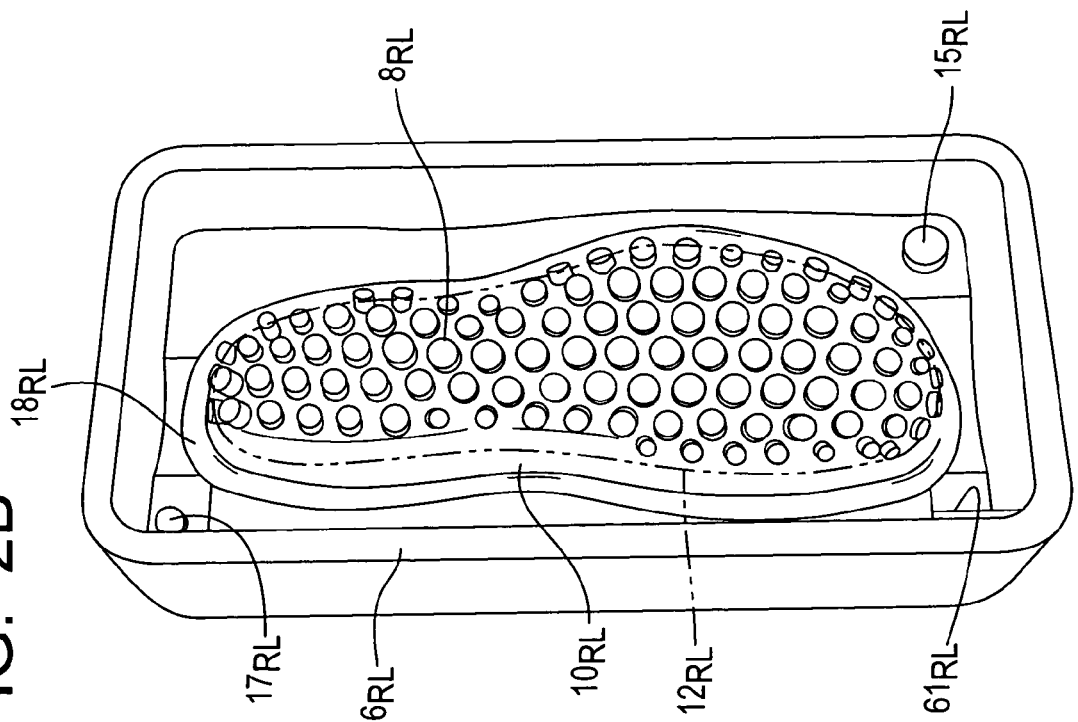
FIGS. 2A-2D show outsole master patterns according to at least some embodiments of the invention.

As previously indicated, master patterns are created for each of the upper and lower surfaces of the right outsole 1 (FIGS. 1A and 1B) and of the left outsole (not shown). Each master pattern includes an outsole shape (a three-dimensional copy of the outsole surface to be molded), as well as other features to be included in a mold element. FIG. 2A, for example, shows master pattern 6$_{RU}$ for the right upper outsole. Master pattern 6$_{RU}$ is machined from a syntactic polyurethane modeling material such as that sold by Huntsman Advanced Materials Americas, Inc. (of Auburn Hills, Mich.) under the trade name RENSHAPE 460. Master pattern 6$_{RU}$ includes an outsole shape 8$_{RU}$ corresponding to the shape of upper surface 4 of outsole 1 and to surface 104$_{RU}$ of mold element 102$_{RU}$. Outsole shape 8$_{RU}$ meets an inclined surface 10$_{RU}$ at parting line 12$_{RU}$. For purposes of explanation, parting lines are marked in the drawings with uneven broken lines. As seen by comparing FIGS. 1A and 2A, parting line 12$_{RU}$ generally follows upper edge 3 of outsole 1. Also formed in master pattern 6$_{RU}$ are a large indentation 14$_{RU}$ and a small indentation 16$_{RU}$ (small indentation 16$_{RU}$ is obscured in FIG. 2A by the rim of master pattern 6$_{RU}$, but its location is indicated generally with an arrow). As will be explained in more detail below, indentations 14$_{RU}$ and 16$_{RU}$ are used to create surface features of mold element 102$_{RU}$ which properly locate mating mold elements. Further formed in master pattern 6$_{RU}$ is a block 61$_{RU}$. As will be explained in more detail below, block 61$_{RU}$ is used to create a surface feature of mold element 102$_{RU}$ that is used to easily locate a hinge plate.

Figure 2B:
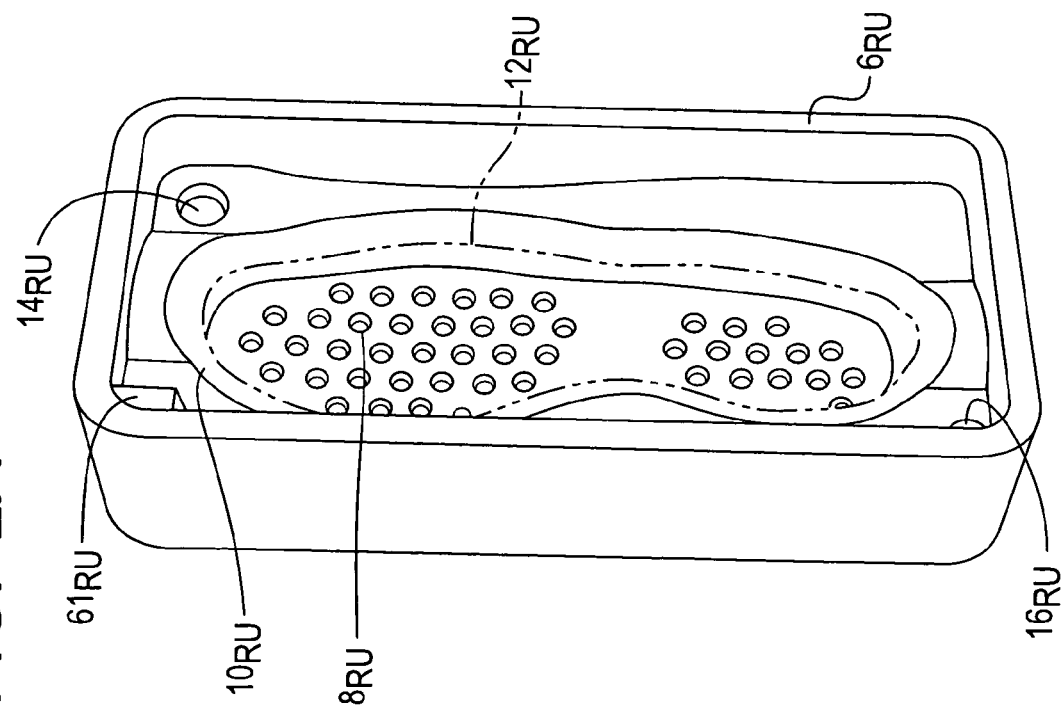
Figure 2C:
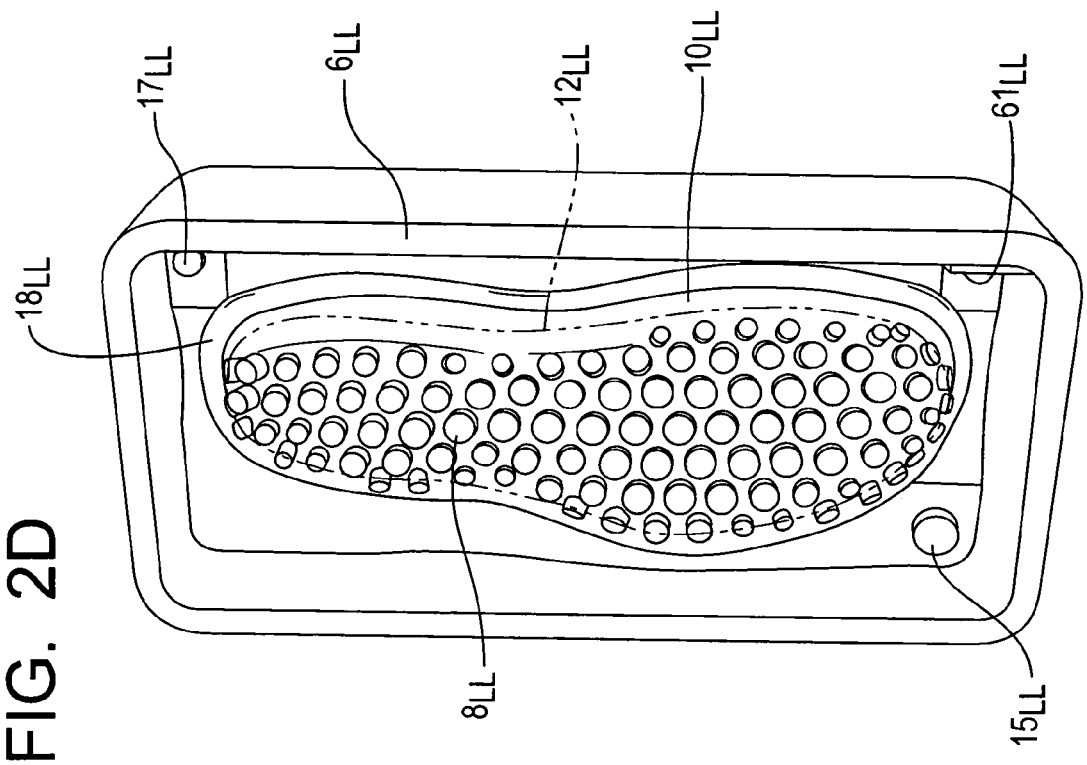
Figure 2D:
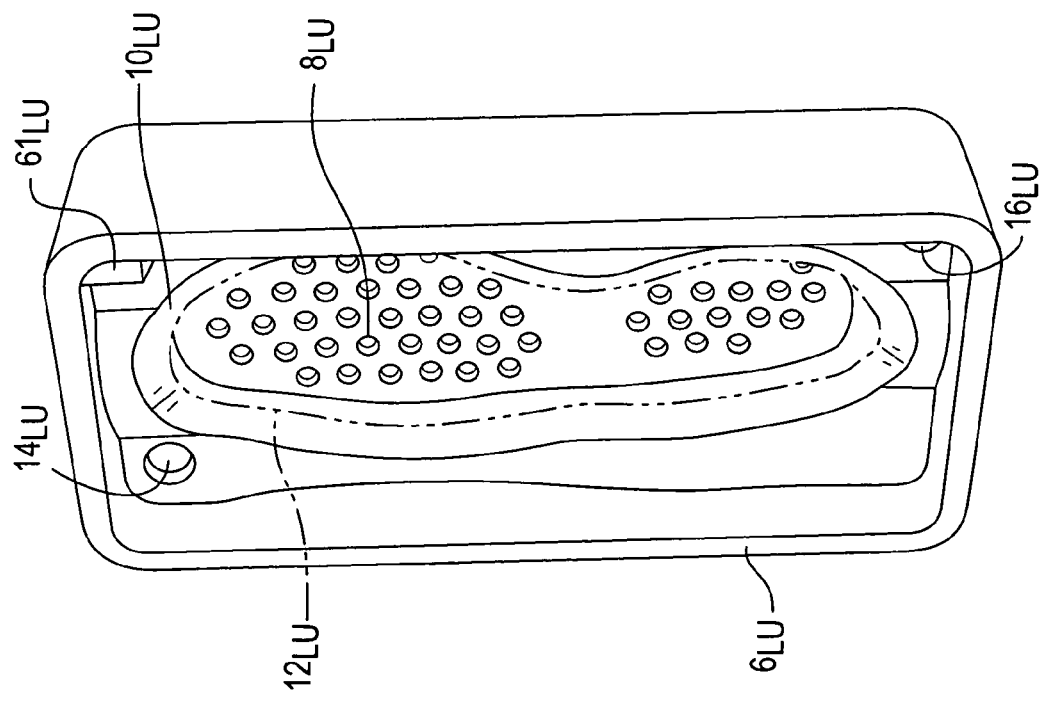

FIG. 2B shows master pattern 6$_{RL}$ corresponding to right lower element 102$_{RL}$. Master pattern 6$_{RL}$, which is also machined from a syntactic polyurethane modeling material, includes an outsole shape 8$_{RL}$ corresponding to lower surface 4 of outsole 1 (FIG. 1B) and to surface 104$_{RL}$ of mold element 102$_{RL}$. Outsole shape 8$_{RL}$ meets an inclined surface 10$_{RL}$ at parting line 12$_{RL}$. A ridge 18$_{RL}$ corresponds to overflow groove 106$_{RL}$ in right lower element 102$_{RL}$, which is explained in more detail below. Large raised region 15$_{RL}$ and small raised region 17$_{RL}$ are also used to create surface features of mold element 102$_{RL}$ which properly locate mating mold elements. Block 61$_{RL}$ is formed in master pattern 6$_{RL}$, and is partially seen in FIG. 2B at the lower left. As will be explained in more detail below, block 61$_{RL}$ is used to create a surface feature of mold element 102$_{RL}$ that is used to easily locate a hinge plate. FIGS. 2C and 2D correspond to master patterns 6$_{LU}$ and 6$_{LL}$, respectively. Master patterns 6$_{LU}$ and 6$_{LL}$ are similar to patterns 6$_{RU}$ and 6$_{RL}$, but are instead used to form the left upper element 102$_{LU}$ and left lower element 102$_{LL}$, respectively. Features of master patterns 6$_{LU}$ and 6$_{LL}$ which are similar to features of master patterns 6$_{RU}$ and 6$_{RL}$ are assigned like numbers.

Figure 3:
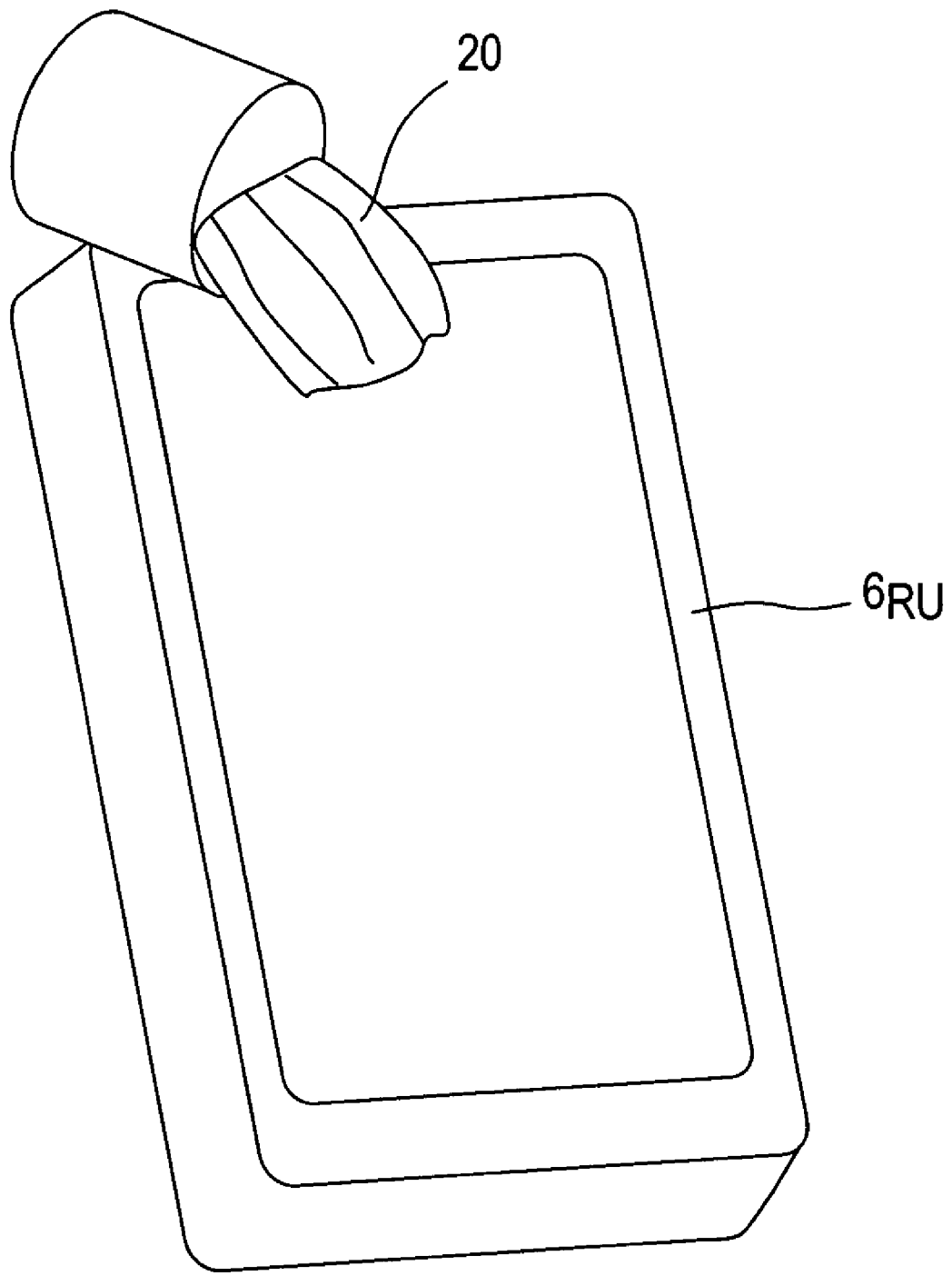
FIG. 3 shows creation of an outsole negative according to at least some embodiments of the invention.

FIG. 3 shows the next step of the mold making process according to at least some embodiments. Silicon material 20 is poured into each of master patterns 6$_{RU}$, 6$_{RL}$, 6$_{LU}$ and 6$_{LL}$ to form an outsole negative, i.e., a reversed three dimensional model of an outsole surface. For simplicity, only master pattern 6$_{RU}$ is shown in FIG. 3. However, each of patterns 6$_{RL}$, 6$_{LU}$ and 6$_{LL}$ is similarly filled with silicon material 20. Although master patterns 6$_{RU}$, 6$_{RL}$, 6$_{LU}$ and 6$_{LL}$ are formed such that each has a wall extending around the pattern surface so as to form a container to hold silicon material 20, such need not be the case. For example, a master pattern without such a wall could be placed within a separate tray and silicon material 20 poured over the master pattern.

Figure 4A:
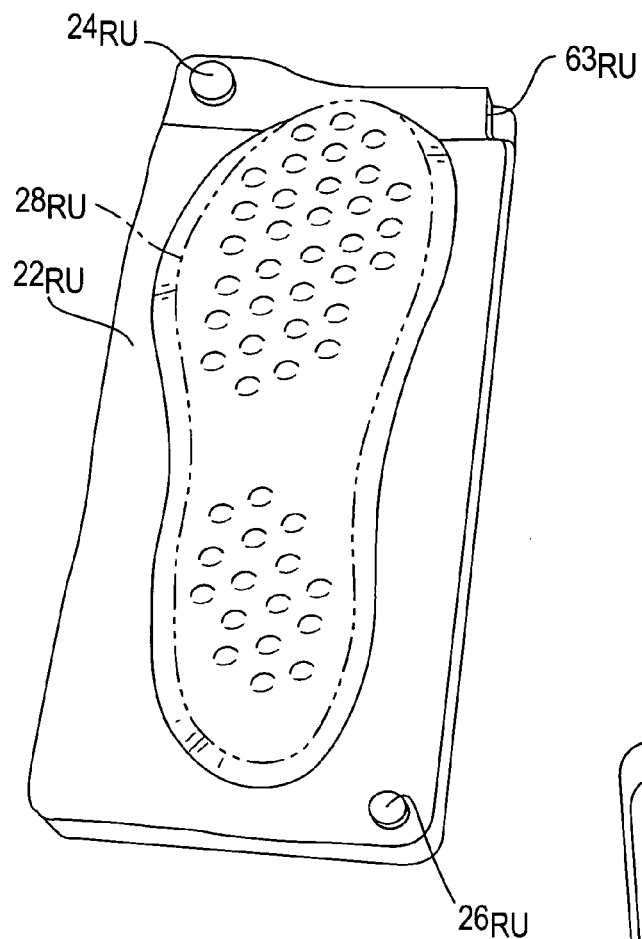
FIGS. 4A-4D show an outsole negatives according to at least some embodiments of the invention.
Figure 4B:
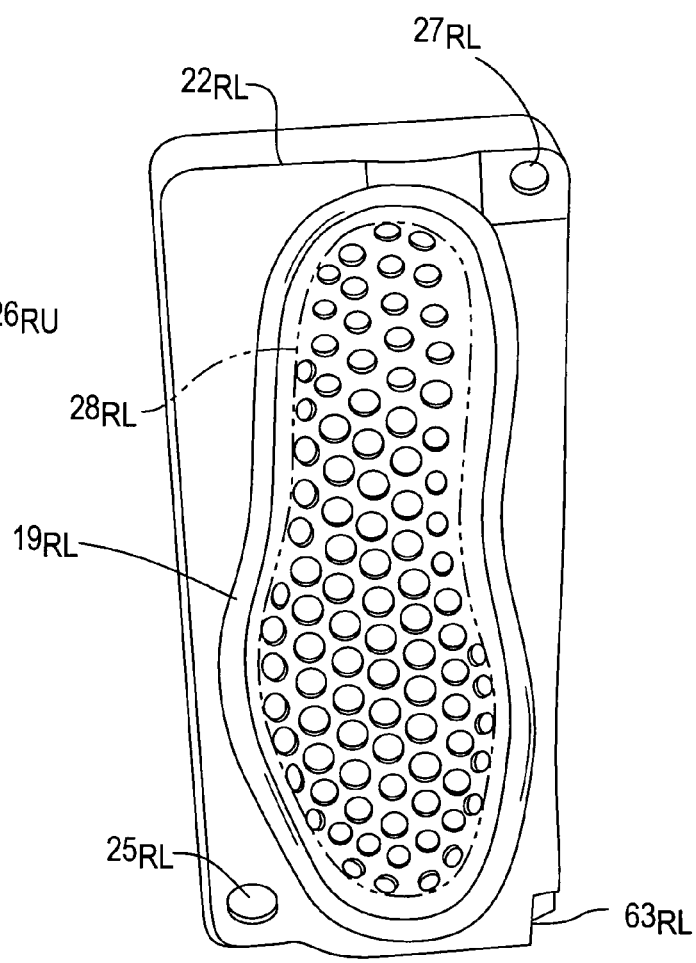
Figure 4C:
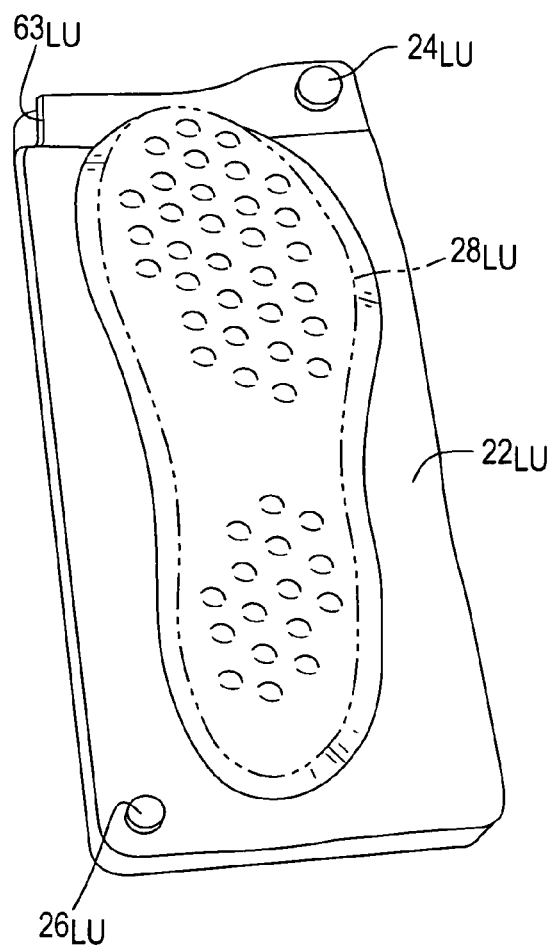
Figure 4D:
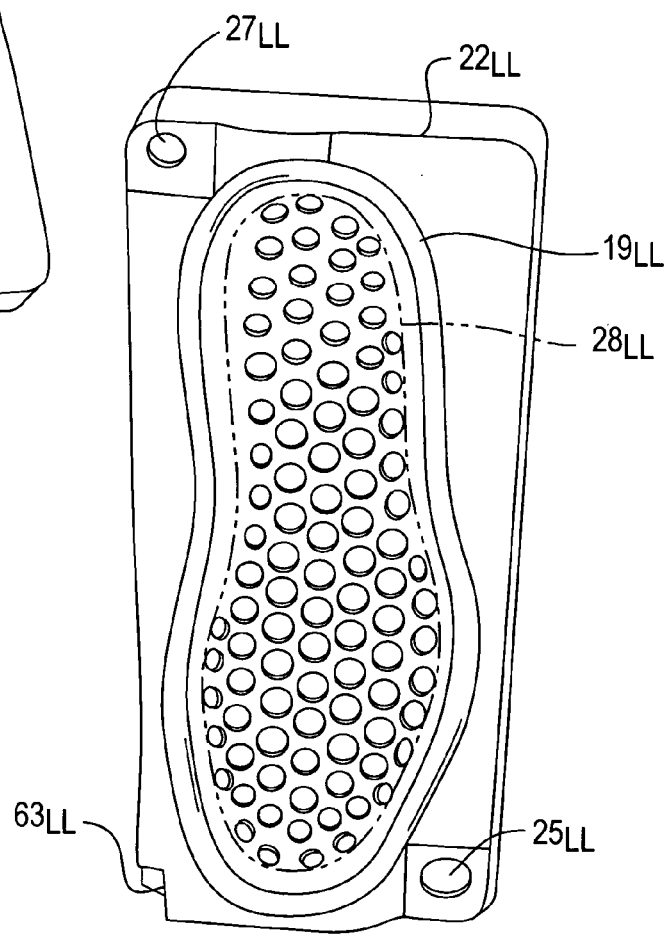

The liquid silicon material 20 poured into master patterns $6_{RU}$, $6_{RL}$, $6_{LU}$ and $6_{LL}$ dries and hardens to form outsole negatives. FIG. 4A shows outsole negative $22_{RU}$ after removal from master pattern $6_{RU}$. Outsole negative $22_{RU}$ is, in effect, a three dimensional model of a mold surface that could be used to create the outsole surface modeled by master pattern $6_{RU}$. Seen in FIG. 4A is a contoured parting line $28_{RU}$ (corresponding to parting line $12_{RU}$ in FIG. 2A), locating post $24_{RU}$ (corresponding to indentation $14_{RU}$ of FIG. 2A), locating post $26_{RU}$ (corresponding to indentation $16_{RU}$ of FIG. 2A) and notch $63_{RU}$ (corresponding to block $61_{RU}$ of FIG. 2A). FIG. 4B shows outsole negative $22_{RL}$, a three dimensional model of a mold surface that could be used to create the outsole surface modeled by master pattern $6_{RL}$, after removal from master pattern $6_{RL}$. Outsole negative $22_{RL}$ includes a contoured parting line $28_{RL}$ (corresponding to parting line $12_{RL}$ in FIG. 2B), locating depression $27_{RL}$ (corresponding to raised region $17_{RL}$ in FIG. 2B), locating depression $25_{RL}$ (corresponding to raised region $15_{RL}$ in FIG. 2B) and notch $63_{RL}$ (corresponding to block $61_{RL}$ of FIG. 2B). Also seen in FIG. 4B is an overflow groove $19_{RL}$. FIG. 4C shows outsole negative $22_{LU}$, a three dimensional model of a mold surface that could be used to create the outsole surface modeled by master pattern $6_{LU}$, after removal from master pattern $6_{LU}$. Seen in FIG. 4C is a contoured parting line $28_{LU}$ (corresponding to parting line $12_{LU}$ in FIG. 2C), locating post $24_{LU}$ (corresponding to indentation $14_{LU}$ of FIG. 2C), locating post $26_{LU}$ (corresponding to indentation $16_{LU}$ of FIG. 2C) and notch $63_{LU}$ (corresponding to block $61_{LU}$ of FIG. 2C). FIG. 4D shows outsole negative $22_{LL}$, a three dimensional model of a mold surface that could be used to create the outsole surface modeled master pattern $6_{LL}$, after removal from master pattern $6_{LL}$. Outsole negative $22_{LL}$ includes a contoured parting line $28_{LL}$ (corresponding to parting line $12_{LL}$ in FIG. 2D), locating depression $27_{LL}$ (corresponding to raised region $17_{LL}$ in FIG. 2D), locating depression $25_{LL}$ (corresponding to raised region $15_{LL}$ in FIG. 2D) and notch $63_{LL}$ (corresponding to block $61_{LL}$ of FIG. 2D). Also seen in FIG. 4D is an overflow groove $19_{LL}$.

Figure 5C:
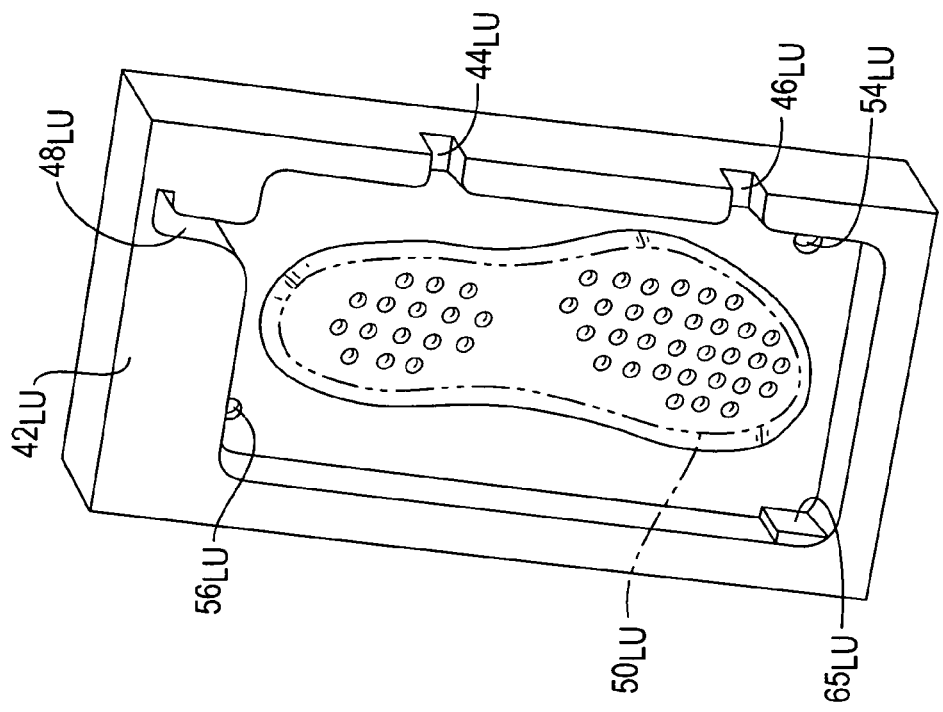
Figure 5D:
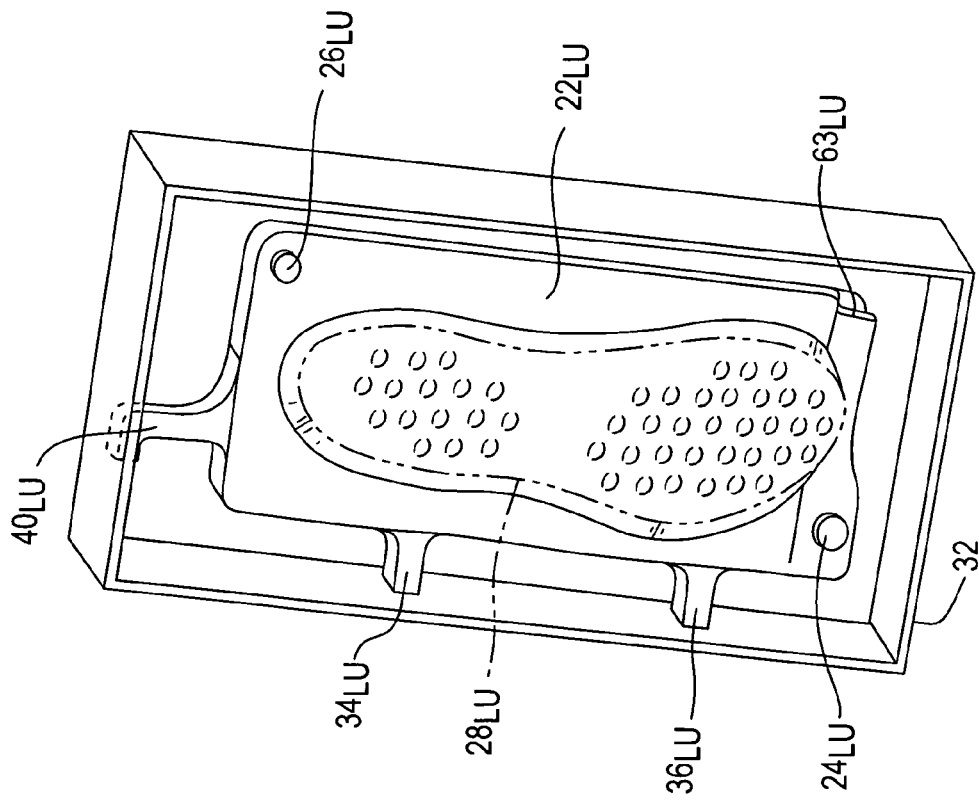
Figure 5E:
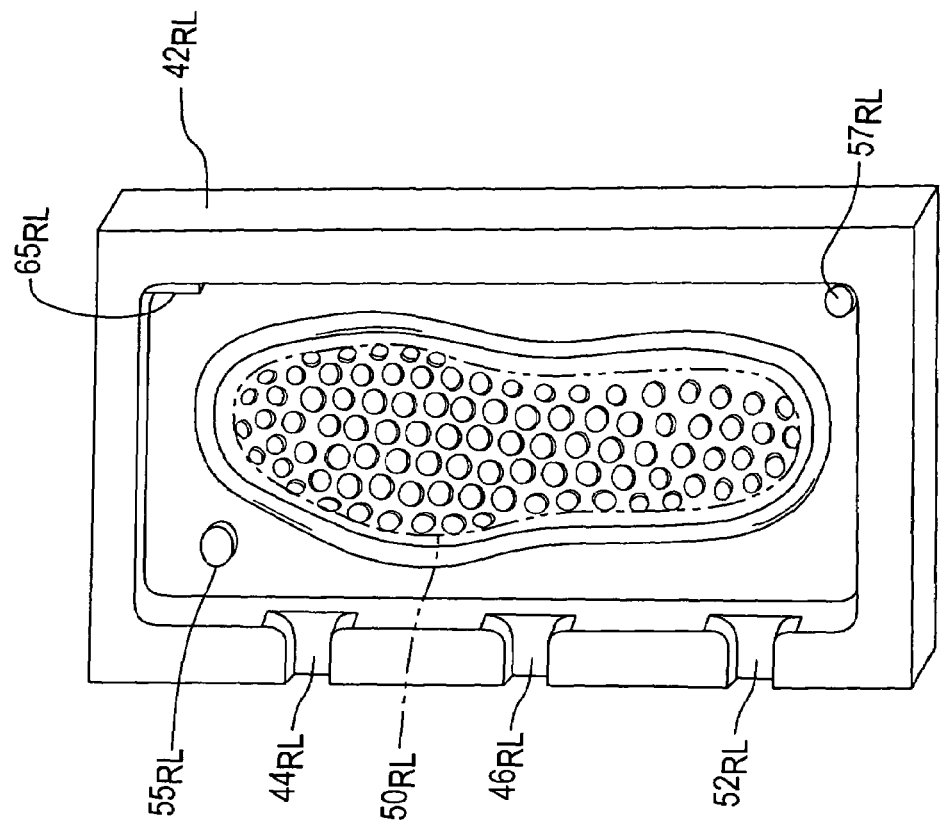
Figure 5F:
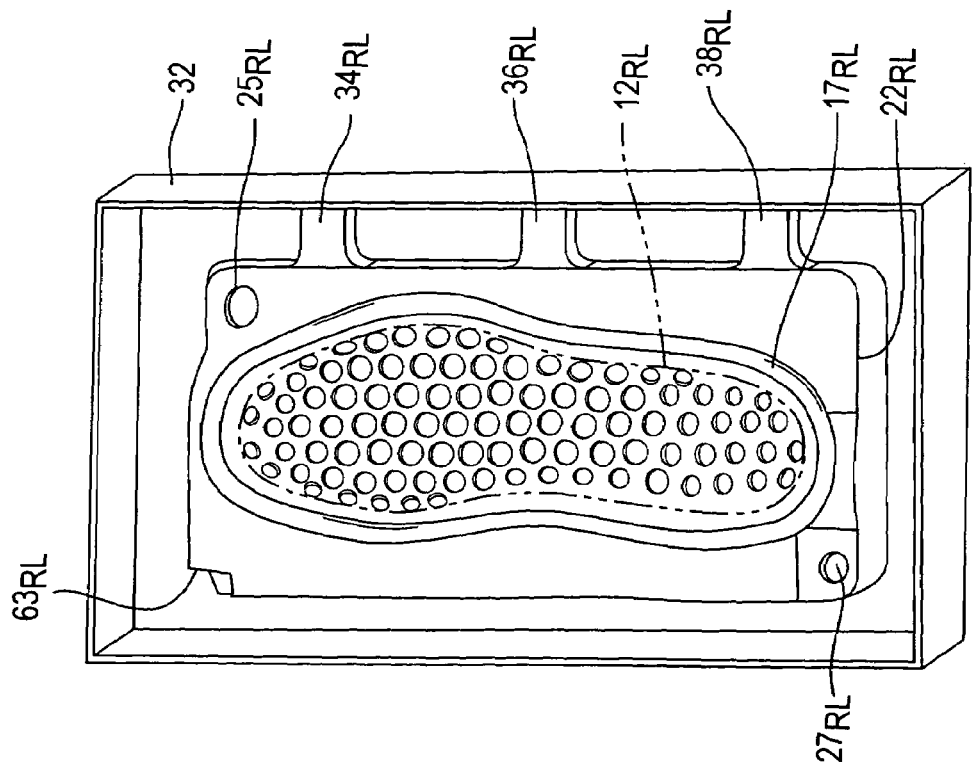

Each of outsole negatives $22_{RU}$, $22_{RL}$, $22_{LU}$ and $22_{LL}$ is next used to create a ceramic casting mold. These ceramic casting molds may then be used to cast mold elements $102_{RU}$, $102_{RL}$, $102_{LU}$ and $102_{LL}$ shown in FIG. 6E. Creation of the ceramic casting molds is shown in FIGS. 5A-5H. In FIG. 5A, outsole negative $22_{RU}$ is placed at the bottom of a four-walled tray 32. Next, tab templates $34_{RU}$ and $36_{RU}$ are placed between one side of outsole negative $22_{RU}$ and an inside surface of a wall of tray 32. A handle template $40_{RU}$ is also placed in contact with outsole negative $22_{RU}$. After these various components are juxtaposed in tray 32, a variety of materials are then poured into the tray and treated to create ceramic casting mold $42_{RU}$ (FIG. 5B). In at least some embodiments, casting mold $42_{RU}$ is formed using the method described in U.S. Pat. No. 5,368,086, incorporated by reference herein. Molten steel or other metal may then be poured into casting mold $42_{RU}$ so as to cast right upper mold element $102_{RU}$ (FIGS. 6A and 6E). As can be seen in FIG. 5B, tab templates $34_{RU}$ and $36_{RU}$ and handle template $40_{RU}$ form volumes $44_{RU}$, $46_{RU}$ and $48_{RU}$ in casting mold $42_{RU}$. Similarly, parting line $28_{RU}$ on outsole negative $22_{RU}$ (FIG. 4A) has been transferred as parting line $50_{RU}$ on casting mold $42_{RU}$. Indentation $54_{RU}$ corresponds to locating post $24_{RU}$ and indentation $56_{RU}$ corresponds to locating post $26_{RU}$. Block $65_{RU}$ corresponds to notch $63_{RU}$.

It should be noted that FIGS. 5A and 5B are partially schematic. In other words, various aspects of FIG. 5A that correspond to aspects of FIG. 5B, and which in turn correspond to aspects of FIGS. 6A-6E, may not have exactly the same shapes or sizes. For example, tab template $34_{RU}$ in FIG. 5A is longer than volume $44_{RU}$ in FIG. 5B, and is somewhat different in shape than tab $108_{RU}$ of FIG. 6A. In actuality, the shape and size of outsole negative $22_{RU}$ with juxtaposed tab templates $34_{RU}$ and $36_{RU}$ and handle template $40_{RU}$ would be very close to the shape and size and of right upper mold element $102_{RU}$. The shape and size of casting mold $42_{RU}$ would similarly be much closer to the shape and size of the open volume within tray 32 of FIG. 5A. FIGS. 5A and 5B are only intended to generally illustrate the process by which outsole negative $22_{RU}$ is used to ultimately create right upper mold element $102_{RU}$, and persons skilled in the art will understand this process in view of the written description herein.

Outsole negatives $22_{RL}$, $22_{LU}$ and $22_{LL}$ are also used to create ceramic casting molds. In FIG. 5C, outsole negative $22_{LU}$ is located in tray 32, as are tab templates $34_{LU}$ and $36_{LU}$ and handle template $40_{LU}$. Using the arrangement of FIG. 5C and the method of U.S. Pat. No. 5,368,086, ceramic casting mold $42_{LU}$ (FIG. 5D) is created. Casting mold $42_{LU}$ has volumes $44_{LU}$, $46_{LU}$ and $48_{LU}$ corresponding to tab templates $34_{LU}$ and $36_{LU}$ and handle template $40_{LU}$. Parting line $28_{LU}$ (FIG. 4B) has similarly been transferred as parting line $50_{LU}$ on casting mold $42_{LU}$. Indentation $54_{LU}$ corresponds to locating post $24_{LU}$ and indentation $56_{RU}$ corresponds to locating post $26_{LU}$. Block $65_{LU}$ corresponds to notch $63_{LU}$. In FIG. 5E, outsole negative $22_{RL}$ is placed in the bottom of tray 32 with tab templates $34_{RL}$, $36_{RL}$ and $38_{RL}$, which are then used to create ceramic casting mold $42_{RL}$ (FIG. 5F) having volumes $44_{RL}$, $46_{RL}$ and $52_{RL}$ corresponding to tab templates $34_{RL}$, $36_{RL}$ and $38_{RL}$. Parting line $28_{RL}$ (FIG. 4C) has been transferred as parting line $50_{RL}$ on casting mold $42_{RL}$. Raised region $55_{RL}$ corresponds to locating depression $25_{RL}$ and raised region $57_{RL}$ corresponds to locating depression $27_{RL}$. Block $65_{RL}$ corresponds to notch $63_{RL}$. In FIG. 5G, outsole negative $22_{LL}$ is placed in the bottom of tray 32 with tab templates $34_{LL}$, $36_{LL}$ and $38_{LL}$, which are then used to create ceramic casting mold $42_{LL}$ (FIG. 5H) having volumes $44_{LL}$, $46_{LL}$ and $52_{LL}$ corresponding to tab templates $34_{LL}$, $36_{LL}$ and $38_{LL}$. Parting line $28_{LL}$ (FIG. 4D) has been transferred as parting line $50_{LL}$ on casting mold $42_{LL}$. Raised region $55_{LL}$ corresponds to locating depression $25_{LL}$ and raised region $57_{LL}$ corresponds to locating depression $27_{LL}$. Block $65_{LL}$ corresponds to notch $63_{LL}$. FIGS. 5C-5H are, similar to FIGS. 5A and 5B, partially schematic in nature.

Figure 7:
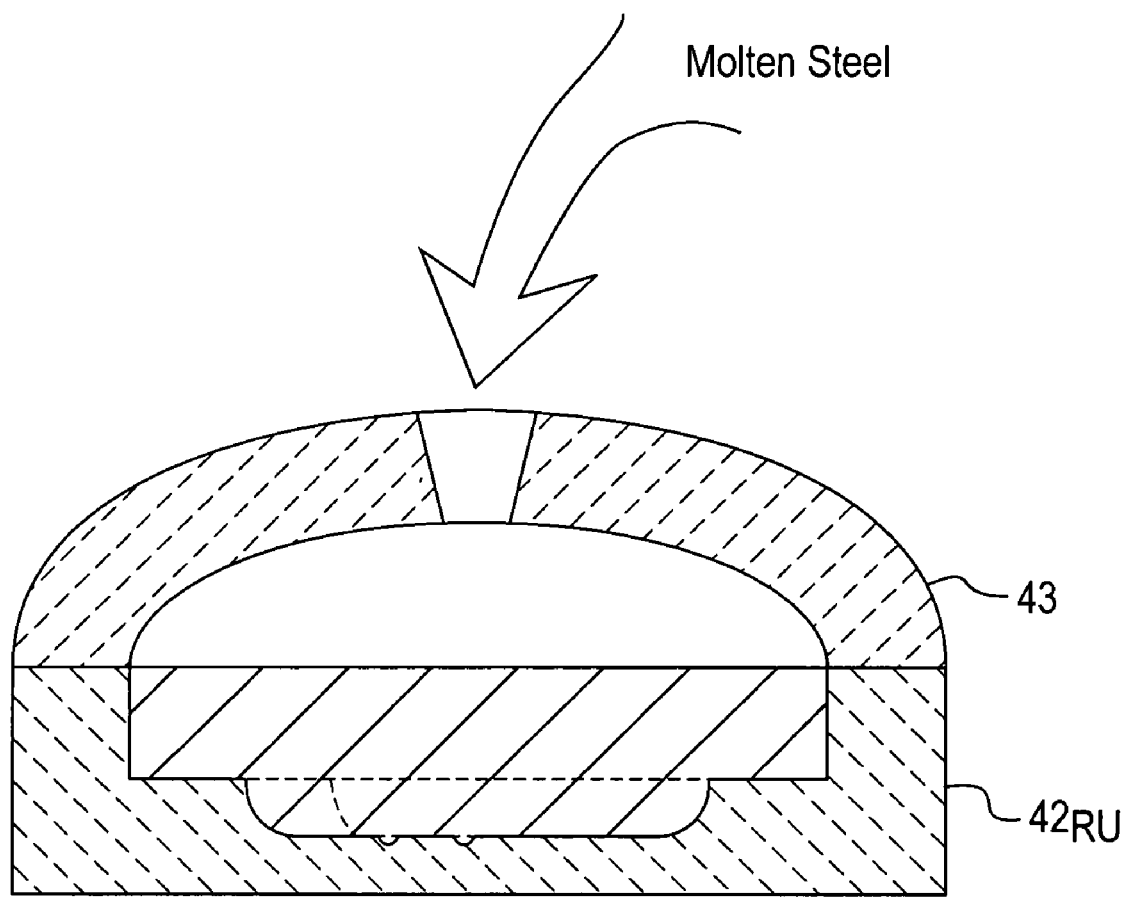
FIG. 7 shows casting of a mold element.

Casting molds $42_{RU}$, $42_{LU}$, $42_{RL}$ and $42_{LL}$ are then used to create the right upper, left upper, right lower and left lower outsole mold elements. In particular, and as partially shown in FIG. 7, steel or other molten metal is poured into each of casting molds $42_{RU}$, $42_{LU}$, $42_{RL}$ and $42_{LL}$. For simplicity, FIG. 7 only shows casting mold $42_{RU}$ having molten metal poured into the mold; a similar procedure is followed with regard to casting molds $42_{LU}$, $42_{RL}$ and $42_{LL}$. A cope 43 may be used when pouring molten metal. Once the molten metal has cooled, it is removed from each of the ceramic casting molds to yield right upper mold element $102_{RU}$ (FIG. 6A), left upper mold element $102_{LU}$ (FIG. 6B), right lower mold element $102_{RL}$ (FIG. 6A) and left lower mold element $102_{LL}$ (FIG. 6B). As shown in FIG. 6A, upper right mold element $102_{RU}$ includes tabs $108_{RU}$ and $110_{RU}$ formed by molten metal which flowed into volumes $44_{RU}$ and $46_{RU}$ (FIG. 5B). Similarly, upper mold element $102_{RU}$ includes handle $114_{RU}$ formed by molten metal flowing into volume $48_{RU}$ (FIG. 5B). Parting line $50_{RU}$ has been transferred to mold element $102_{RU}$ as parting line $116_{RU}$. Locating posts $118_{RU}$ and $120_{RU}$ correspond to indentations $54_{RU}$ and $56_{RU}$, respectively. Notch $163_{RU}$ corresponds to block $65_{RU}$. As shown in FIG. 6B, upper left mold element $102_{LU}$ similarly includes tabs $108_{LU}$ and $110_{LU}$ formed by molten metal flowing into volumes $44_{LU}$ and $46_{LU}$ (FIG. 5D), as well as handle $114_{LU}$ formed by molten metal flowing into volume $48_{LU}$. Parting line $50_{LU}$ has been transferred to mold element $102_{LU}$ as parting line $116_{LU}$. Locating posts $118_{LU}$ and $120_{LU}$ correspond to indentations $54_{LU}$ and $56_{LU}$, respectively. Notch $163_{LU}$ corresponds to block $65_{LU}$. As shown in FIG. 6A, lower right mold element $102_{RL}$ includes tabs $108_{RL}$, $110_{RL}$ and $112_{RL}$ formed by molten metal flowing into volumes $44_{RL}$, $46_{RL}$ and $52_{RL}$ (FIG. 5F). Parting line $50_{RL}$ has been transferred to mold element $102_{RL}$ as parting line $116_{RL}$. Locating depression $119_{RL}$ and locating depression $121_{RL}$ correspond to raised regions $55_{RL}$ and $57_{RL}$, respectively. Notch $163_{RL}$ corresponds to block $65_{RL}$. As shown in FIG. 6B, lower left mold element $102_{LL}$ includes tabs $108_{LL}$, $110_{LL}$ and $112_{LL}$ formed by molten metal flowing into volumes $44_{LL}$, $46_{LL}$ and $52_{LL}$ (FIG. 5H). Parting line $50_{LL}$ has been transferred to mold element $102_{LL}$ as parting line $116_{LL}$. Locating depression $119_{LL}$ and locating depression $121_{LL}$ correspond to raised regions $55_{LL}$ and $57_{LL}$, respectively. Notch $163_{LL}$ corresponds to block $65_{LL}$. Notably, parting lines $116_{RU}$, $116_{RL}$, $116_{LU}$ and $116_{LL}$ are formed during the casting step. In other words, the general shapes of the mold element surfaces that define the parting lines are cast, and are not the result of extensive machining or other labor-intensive hand finishing steps. Some minimal hand finishing (e.g., grinding, polishing etc.) may be performed after casting to obtain desired surface finish, to remove slag, etc.

Figure 6D:
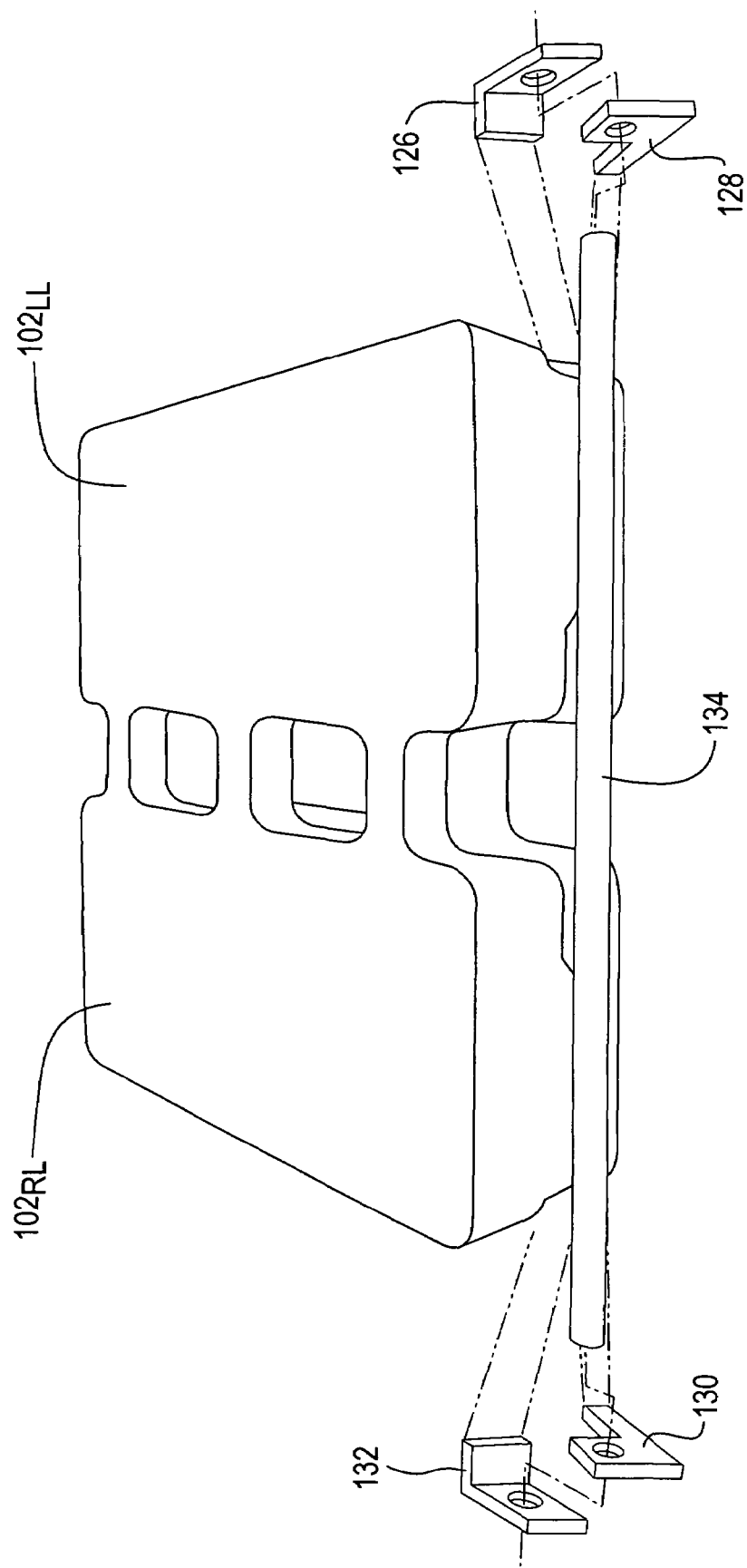
Figure 6E:
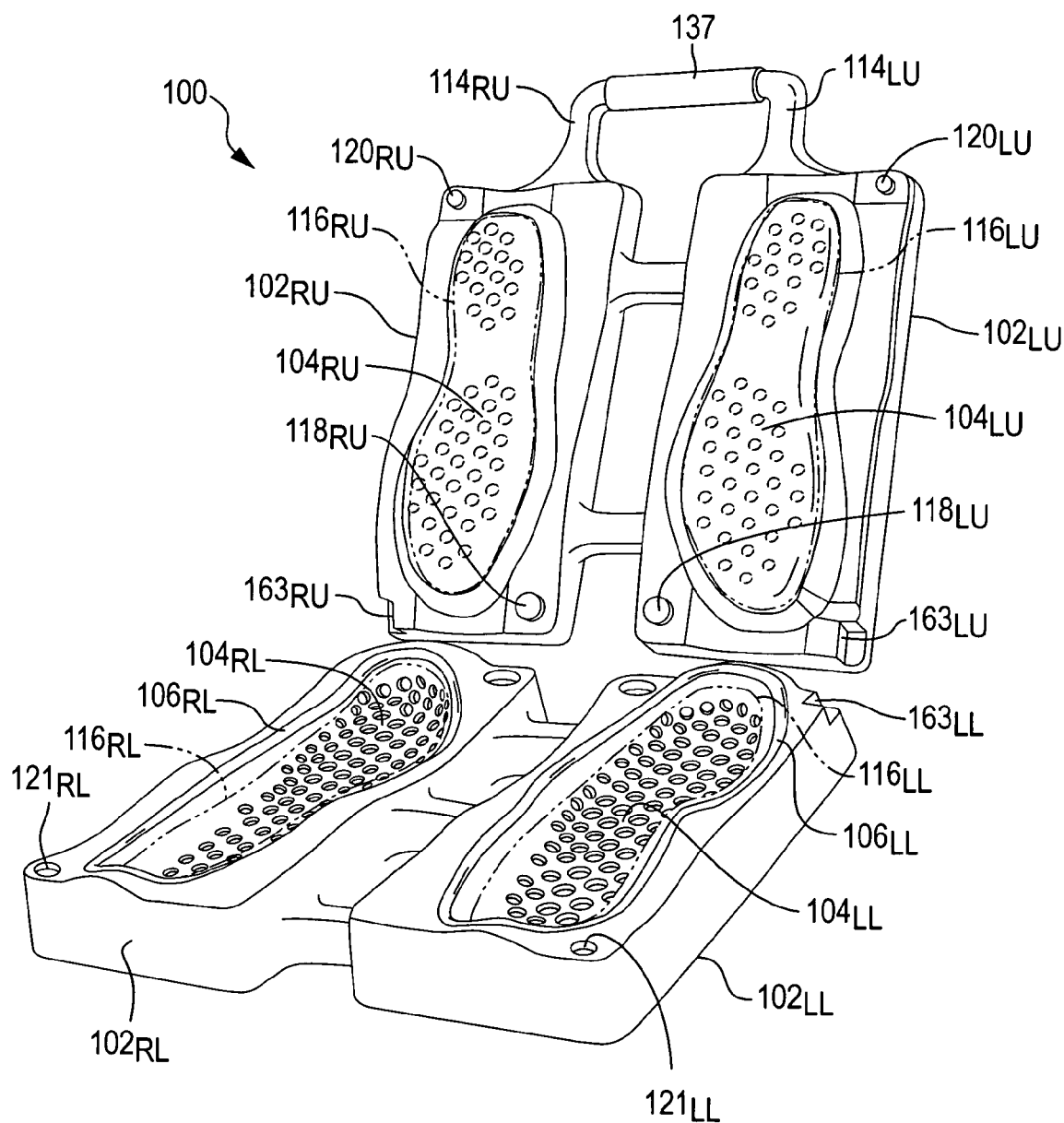

FIGS. 6C-6E show assembly of upper right element $102_{RU}$, lower right element $102_{RL}$, upper left element $102_{LU}$ and lower left element $102_{LL}$ to create mold assembly 100. Right upper and lower elements $102_{RU}$ and $102_{RL}$ are mated together as shown by the broken line arrows in FIG. 6A. In particular, locating posts $118_{RU}$ and $120_{RU}$ mate with depressions $119_{RL}$ and $121_{RL}$, respectively, so as to correctly position the right side mold elements. FIG. 6C shows elements $102_{RU}$ and $102_{RL}$ mated together. Left upper and lower elements $102_{LU}$ and $102_{LL}$ are mated together as shown by the broken line arrows in FIG. 6B, and are correctly positioned by the interaction of posts $118_{LU}$ and $120_{LU}$ with depressions $119_{LL}$ and $121_{LL}$, respectively. FIG. 6C similarly shows elements $102_{LU}$ and $102_{LL}$ mated together. Mated right side elements $102_{RU}$ and $102_{RL}$ are then positioned next to mated left side elements $102_{LU}$ and $102_{LL}$ as shown by the broken line arrows in FIG. 6C. Specifically, the ends of tabs $108_{RU}$, $110_{RU}$, $108_{RL}$, $110_{RL}$ and $112_{RL}$ are placed in butting contact with the ends of tabs $108_{LU}$, $110_{LU}$, $108_{LL}$, $110_{LL}$ and $112_{LL}$, respectively. A small length of metal pipe 137 is placed over the ends of handle $114_{RU}$ and handle $114_{LU}$. Pipe length 137 is tack welded to handles $114_{RU}$ and $114_{LU}$, and the adjoining tab ends are also tack welded together. The right and left upper elements $102_{RU}$ and $102_{LU}$ are then separated from right and left lower elements $102_{RL}$ and $102_{LL}$, and the tack welded connections reinforced by more welding (not shown). Upper mold half 122 (consisting of elements $102_{RU}$ and $102_{LU}$) and lower mold half 124 (consisting of elements $102_{RL}$ and $102_{LL}$) are then re-mated as shown in FIG. 6D, and hinge plates 126, 128, 130 and 132 are added by bolts, by welding or in another suitable manner. A hinge pin 134 is then inserted into holes in hinge plates 126, 128, 130 and 132. In at least some embodiments, and as shown in FIG. 6D, hinge plates 126, 128, 130 and 132 have ends which fit within notches $163_{RU}$, $163_{LU}$, $163_{RL}$ and $163_{LL}$ formed (by casting) in the comers of mold elements $102_{RU}$, $102_{RL}$, $102_{LU}$ and $102_{LL}$. FIG. 6E shows the completed mold assembly, but with hinge pin 134 and hinge plates 126, 128, 130 and 132 omitted for simplicity.

Mold assembly 100 can then be used to manufacture outsole 1 (FIGS. 1A and 1B) and its left shoe counterpart. Synthetic rubber blanks or other outsole material is placed into regions $104_{RL}$ and $104_{LL}$ of right lower mold element $102_{RL}$ and left lower mold element $102_{LL}$, respectively. Upper mold half 122 is then closed, and the mold assembly heated. Region $104_{RU}$ of upper right mold element $102_{RU}$ comes to rest over region $104_{RL}$ of right lower mold element $102_{RL}$. As the blanks are heated and flow into the mold volumes, excess molten material is pushed out of region $104_{RL}$ and into overflow groove $106_{RL}$. Regions $104_{RU}$ and $104_{RL}$ are sealed along parting lines $116_{RU}$ and $116_{RL}$, with the molten material inside the space formed by regions $104_{RU}$ and $104_{RL}$ becoming a molded right shoe outsole. Region $104_{LU}$ of upper left mold element $102_{LU}$ similarly comes to rest over region $104_{LL}$ of left lower mold element $102_{LL}$, pushing excess molten material into overflow groove $106_{LL}$, and sealing along parting lines $116_{LU}$ and $116_{LL}$. The molten material inside the space formed by regions $104_{LU}$ and $104_{LL}$ becomes a molded left shoe outsole.

Mold assembly 100 offers numerous advantages over existing shoe component molds and methods for making same. Because the parting line is formed as part of the mold casting process, significant amounts of hand finishing can be avoided. Moreover, a separate carrier is not needed to hold and align the elements of the mold. Mold assembly 100 also offers a significant weight reduction when compared to prior art outsole molds, and is significantly less cumbersome to manipulate during outsole molding operations.

While particular embodiments of the invention have been shown and described, it is recognized that various modifications thereof will occur to those skilled in the art. For example, the preceding description and drawings show mold elements permanently joined by welding. Other techniques for permanently joining mold elements could be used (e.g., mechanical fasteners such as bolts). As yet another example, a handle or handle portion could be cast as part of the lower mold elements. The joined upper elements and joined lower elements could be coupled in a manner other than by attaching a hinge. As yet another variation, the volumes (e.g., $44_{RU}$, $46_{RU}$ and/or $48_{RU}$ of FIG. 5B) in a casting mold (e.g., $42_{RU}$ of FIG. 5B) corresponding to tabs (e.g., $108_{RU}$, $110_{RU}$ of FIG. 6A) and/or a handle (e.g., $114_{RU}$ of FIG. 6A) need not be formed by juxtaposing templates (e.g., $34_{RU}$, $36_{RU}$ and/or $40_{RU}$ of FIG. 5A) and an outsole negative (e.g., $22_{RU}$). In alternate embodiments, such templates are created by machining, from modeling material and as part of a master pattern (e.g., $6_{RU}$ of FIG. 2A), volumes corresponding to the templates. When the master pattern is then covered with silicon material (similar to FIG. 3) to form an outsole negative, the resulting outsole negative has integrally formed tab and/or handle templates. In such embodiments, the master pattern may be formed without a surrounding side wall as shown in FIG. 2A, or the side wall(s) may be located further from the outsole pattern surface on sides where templates are machined. These and other modifications are within the scope of the invention.

The invention claimed is:
1. A method, comprising:
juxtaposing a first footwear component negative and a first template, wherein the first footwear component negative includes a three dimensional model of a portion of a mold element for molding a lower surface of a right shoe component, and wherein the first template is a three dimensional model of an attachment tab;

creating a lower right casting mold based on the juxtaposed first footwear component negative and first template;

casting a lower right mold element using the lower right casting mold, the lower right mold element having an attachment tab;

juxtaposing a second footwear component negative and a second template, wherein the second footwear component negative includes a three dimensional model of a portion of a mold element for molding an upper surface of the right shoe component, and wherein the second template is a three dimensional model of an attachment tab;

creating an upper right casting mold based on the juxtaposed second footwear component negative and second template;

casting a metal upper right mold element using the upper right casting mold, the upper right mold element having an attachment tab and further having a first surface defining at least a portion of a mold volume for molding the right shoe component;

juxtaposing a third footwear component negative and a third template, wherein the third footwear component negative includes a three dimensional model of a portion of a mold element for molding a lower surface of a left shoe component, and wherein the third template is a three dimensional model of an attachment tab;

creating a lower left casting mold based on the juxtaposed third footwear component negative and third template;

casting a lower left mold element using the lower left casting mold, the lower left mold element having an attachment tab;

juxtaposing a fourth footwear component negative and a fourth template, wherein the fourth footwear component negative includes a three dimensional model of a portion of a mold element for molding an upper surface of the left shoe component, and wherein the fourth template is a three dimensional model of an integrally cast attachment member;

creating an upper left casting mold based on the juxtaposed fourth footwear component negative and fourth template;

casting a metal upper left mold element using the upper left casting mold, the upper left mold element having the integrally cast attachment member and further having a second surface defining at least a portion of a mold volume for molding the left shoe component and an integrally cast attachment member;

joining the attachment tabs of the lower left and lower right mold elements; and permanently joining the integrally cast attachment member of the upper left mold element to a portion of the upper right mold element, said permanently joining including joining the integrally cast attachment member to the attachment tab of the upper right mold element.

2. The method of claim 1, wherein:
at least one of the juxtaposing steps includes juxtaposing a handle template with one of the first, second, third or fourth footwear component negatives, and
at least one of the casting steps includes casting a mold element having an integral handle portion.

3. The method of claim 1, further comprising the step of coupling the joined upper left and upper right mold elements to the joined lower left and lower right mold elements.

4. The method of claim 3, wherein the joined upper left and upper right mold elements and the joined lower left and lower right mold elements are coupled with a hinge.

5. The method of claim 4, wherein:
at least one of the juxtaposing steps includes juxtaposing a handle template with one of the first, second, third or fourth footwear component negatives, and
at least one of the casting steps includes casting a mold element having an integral handle portion.

6. The method of claim 3, wherein:
at least one of the juxtaposing steps includes juxtaposing a handle template with one of the first, second, third or fourth footwear component negatives, and
at least one of the casting steps includes casting a mold element having an integral handle portion.

* * * * *